Feb. 2, 1932.  D. G. GAYLE  1,843,391
TRAY SUPPORTING DEVICE
Filed June 9, 1926

Inventor
Dabney G. Gayle
By J. W. Milbury
Attorney

Patented Feb. 2, 1932

1,843,391

UNITED STATES PATENT OFFICE

DABNEY G. GAYLE, OF COSHOCTON, OHIO, ASSIGNOR TO AMERICAN ART WORKS, INC., COSHOCTON, OHIO, A CORPORATION OF OHIO

TRAY SUPPORTING DEVICE

Application filed June 9, 1926. Serial No. 114,733.

The present invention relates to tray supporting devices and more particularly to a device of this type adapted to support a tray upon the side wall of an automobile so that patrons may be served with refreshments in their cars.

The devices by means of which trays are now supported upon the side walls of automobiles comprise mechanisms which are unnecessarily complicated. They include pawl and ratchet means, spring catches and other similar arrangements involving a number of moving parts and which may not always be adjusted to exactly fit a particular automobile and which are quite liable to get out of order.

The principal object of my invention is to provide a tray supporting device which may be adjusted to exactly fit the side wall of any automobile.

Another object of the invention is to provide a gripping mechanism for a device of this type which comprises a minimum number of moving parts.

A still further object of the invention is to provide a device of this type which may be readily and very cheaply manufactured.

Figure 1:
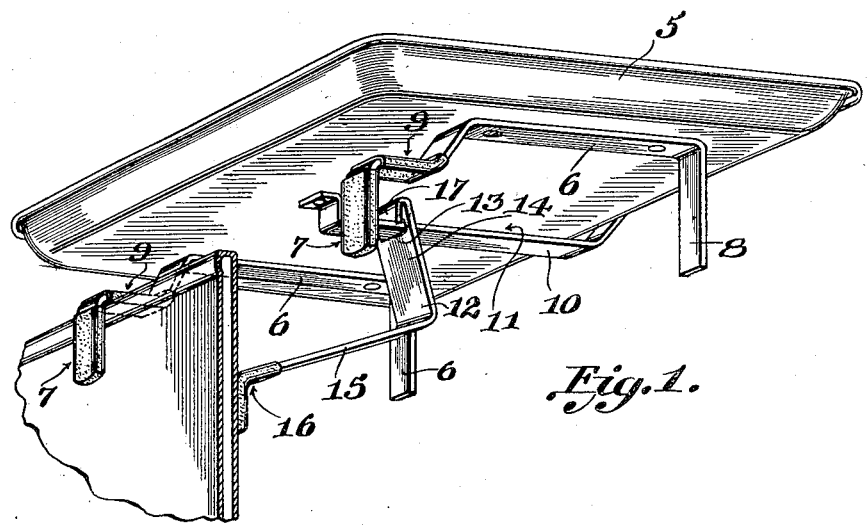
Figure 2:
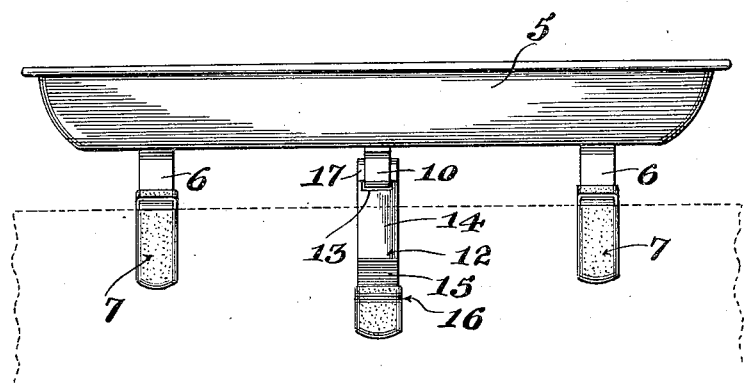

In the drawings, wherein similar numerals refer to like parts throughout the views, Fig. 1 is a side view of the device, in perspective, as it appears when fastened upon the side wall of an automobile, the wall of the automobile being shown in broken lines, and Fig. 2 is a front view of the device shown in Fig. 1.

The numeral 5 designates a serving tray of the usual type. A strip of angled metal 6 is fastened upon the lower side of the tray at each end thereof, rivets or a weld being used to hold the strips to the tray. As shown in the drawings, the angled strips 6 are substantially U-shaped and their depending legs 7 and 8 form a stand for the tray so that it may be placed upon a table or other flat surface. The legs 7 of the strips 6 are bent inwardly at their upper ends to form shoulders 9.

A third metal strip 10 is fastened to the lower side of the tray preferably between the strips 6, only the ends of the strip 10 being attached to the tray, thus spacing the intermediate portion from the tray to form a slideway 11. A movable gripping member 12 of right-angled material is carried upon the slideway 11, the member 12 having a slot 13 adjacent the end of one arm 14 through which the slideway is fitted. The end of the arm 14 is bent back upon itself to form a tip 17 for a purpose hereinafter described. The other arm 15 of the gripping member 12 has its end bent at an angle, as shown at 16, so that it will be substantially parallel to the legs 7 when positioned upon an automobile wall.

The drawings illustrate the manner in which the supporting device of my invention is used to hold a tray upon the upper edge of the side wall of an automobile, the wall being indicated in the drawings by the letter A. The shoulders 9 of the fixed strips or members 6 are placed upon the top edge of the car wall and the legs 7 are drawn into contact with one side face of the wall. The movable gripping member 12 is then moved so that the end 16 of its arm 15 will abut against the opposite side face of the car wall. When the movable gripping member 12 is pushed to the limit of its movement against the car wall, the tip 17 of leg 14 will bear upon the upper side of the slideway 11, thus preventing the gripping member from falling down and away from the car wall, and the gripping member will be clamped in this position by the weight of the tray.

To release the tray from the car wall, it is merely necessary to lift the tray at the edge adjacent the legs 8 and then pull the movable gripping member 12 backwardly.

The legs 7 and shoulders 9 and the portion 16 of the gripping member may be covered with rubber or similar material to prevent scratching the automobile wall.

Any desired advertising matter may be lithographed or printed upon the tray 5.

It will be seen, from the foregoing, that my supporting device is readily adjustable and can be exactly fitted to any car wall or similar structure because the gripping member 12 may be locked at any point along the slideway 11. It will also be seen that the gripping action is exerted through the force of the weight of the tray, without other means.

The legs 7 and 8 are long enough to permit the tray to be placed upon a flat surface without interference by the gripping member 12.

I claim:

A supporting device for trays comprising a fixed arm secured to the tray and adapted to contact with one side of a vertically disposed structure, a guideway, and a movable substantially right-angled member having its arms disposed substantially parallel and at right angles to the tray, respectively, the upper end of the arm which is disposed at right angles to the tray being bent back upon itself and provided with an aperture opposite the tip of the bent back portion whereby the movable right-angled member is adjustable along the guideway and may be locked in frictional engagement therewith to hold the end of the parallel disposed arm against the opposite side of the vertical structure.

DABNEY G. GAYLE.